(12) United States Patent
Venkata

(10) Patent No.: US 9,229,814 B2
(45) Date of Patent: Jan. 5, 2016

(54) DATA ERROR RECOVERY FOR A STORAGE DEVICE

(71) Applicant: Seagate Technology LLC, Cupertino, CA (US)

(72) Inventor: Sumanth Jannyavula Venkata, Shakpoee, MN (US)

(73) Assignee: Seagate Technology LLC, Cupertino, CA (US)

(*) Notice: Subject to any disclaimer, the term of this patent is extended or adjusted under 35 U.S.C. 154(b) by 87 days.

(21) Appl. No.: 13/843,764

(22) Filed: Mar. 15, 2013

(65) Prior Publication Data

US 2014/0281702 A1    Sep. 18, 2014

(51) Int. Cl.
*G06F 11/14* (2006.01)
*G06F 11/07* (2006.01)
*G06F 11/20* (2006.01)

(52) U.S. Cl.
CPC ........ *G06F 11/1412* (2013.01); *G06F 11/0793* (2013.01); *G06F 11/2094* (2013.01)

(58) Field of Classification Search
CPC ............ G06F 11/1412; G06F 11/1448; G06F 11/1451; G06F 11/1469; G06F 11/2046; G06F 11/2094; G06F 11/0709; G06F 11/1435; G06F 11/2056
See application file for complete search history.

(56) References Cited

U.S. PATENT DOCUMENTS

| | | | |
|---|---|---|---|
| 7,159,150 B2* | 1/2007 | Kenchammana-Hosekote et al. | 714/43 |
| 7,409,586 B1* | 8/2008 | Bezbaruah | 714/13 |
| 7,739,543 B1* | 6/2010 | Pittman et al. | 714/6.32 |
| 7,890,796 B2* | 2/2011 | Pawar et al. | 714/6.13 |
| 8,683,259 B2* | 3/2014 | Grube | 711/167 |
| 2004/0128587 A1* | 7/2004 | Kenchammana-Hosekote | 714/43 |
| 2011/0289359 A1* | 11/2011 | Resch | 714/42 |

* cited by examiner

*Primary Examiner* — Nadeem Iqbal
(74) *Attorney, Agent, or Firm* — Cesari & Reed LLP; Kirk A. Cesari

(57) ABSTRACT

A storage device is described that detects a data error and then notifies a distributed file system, for example, of such error. A data recovery can then be initiated in many ways, one way by the storage device.

25 Claims, 7 Drawing Sheets

DATA ERROR RECOVERY FOR A STORAGE DEVICE

SUMMARY

A storage device is described that detects a data error and then notifies a distributed file system, for example, of such error. A data recovery can then be initiated in many ways, one way by the storage device.

DETAILED DESCRIPTION

A distributed file system (DFS) allows a client to access data from multiple distributed storage interconnected on a network. One such DFS is Hadoop's HDFS. HDFS uses "datanodes" as the actual locations to store the data, with another server functioning as a "namenode" to map the data as file names to the datanodes. When the client requests access to the data, the namenode identifies to the client the datanode that stores the data. The client then accesses the data on the identified datanodes.

To improve fault tolerance, availability and performance, many DFSs use file replication. For example, HDFS saves a file and then replicates it onto other datanodes. HDFS uses a default replication factor of three, for example two copies in the same rack and one copy in a different rack.

Figure 1:
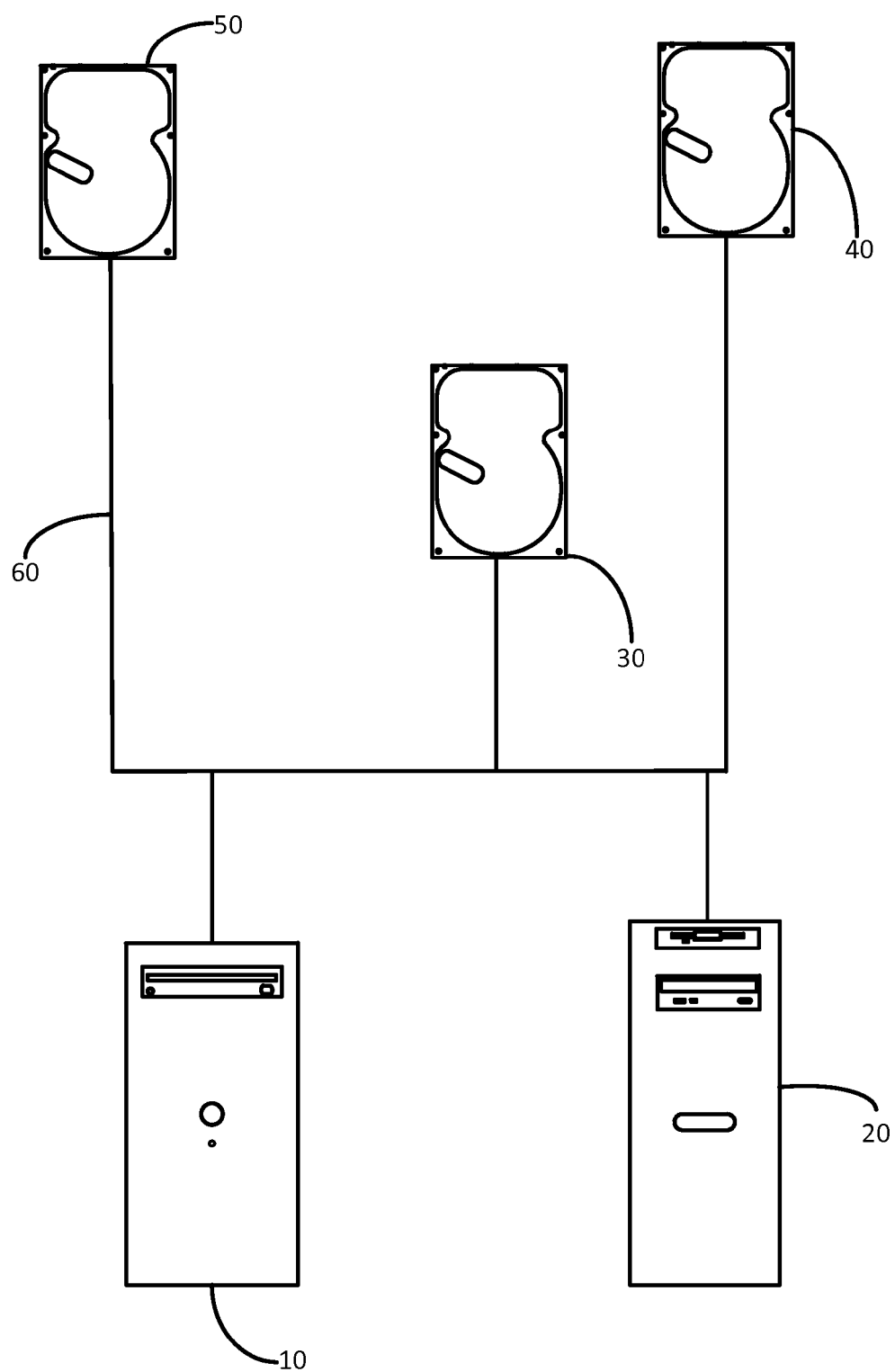
FIG. 1 shows a distributed file system.

FIG. 1 illustrates a DFS. A server 10 is coupled to a client 20 and disc drives 30, 40 and 50 by way of network connection 60. Disc drives 30, 40 and 50 are examples of a distributed storage, which as explained below can be an intelligent storage or a host that includes mass storage. Server 10 can be the "namenode" for the HDFS and disc drives 30, 40 and 50 can be the "datanodes" for the HDFS. Regardless, server 10 maps the locations of the files stored on disc drives 30, 40 and 50. Specifically, server 10 keeps metadata like a list of files, a list of blocks for each file and a list of disc drives that have replicated blocks. Client 20 is also using the DFS so that when it wants to access a file, client 20 communicates with server 10 to get the location information of the file, i.e. which disc drives store the file blocks. Once that information is received from server 10, client 20 interacts with disc drives 30, 40 or 50 to access the desired file.

To illustrate, client 20 requests to save a file. It communicates this with server 10, which then assigns disc drive 30 to save the file blocks. Information identifying disc drive 30 is sent back to client 20 that then saves the file blocks on disc drive 30. Disc drive 30 can communicate with disc drive 40 to replicate the file blocks. Likewise, disc drive 40 can communicate with disc drive 50 to replicate the file blocks.

Some DFS have means to handle data errors. For example, a datanode in HDFS performs error detection on HDFS files using a CHECKSUM function. If a data error is found, the datanode notifies the namenode, which removes that datanode from the DFS and re-replicates the data to another datanode. However, if the data error can be corrected, the DFS would not have to remove the datanode. Thus time and money is saved.

The following describes how a data error can be corrected. The disc drives shown in FIG. 1 can use a DFS such as HDFS. An operating system may also be on the disc drive as needed. In the case for HDFS, the Linux kernel is also operating on the disc drives, if not the entire Linux operating system. If needed, additional electronics such as a more powerful processor/controller can be incorporated into the disc drives to run the HDFS and other software like Linux. Particularly, with processors becoming more powerful, it is now feasible to have a complete operating system such as Linux running on an SoC (system on a chip) in a disc drive. The disc drive can use a communication link like an Ethernet port because the operating system allows networking applications to run on the SoC. Thus, disc drive 30 can operate in the DFS shown without being part of a host. This makes disc drive 30 an "intelligent" storage. Disc drives 40 and 50 can be likewise configured.

Figure 2A:
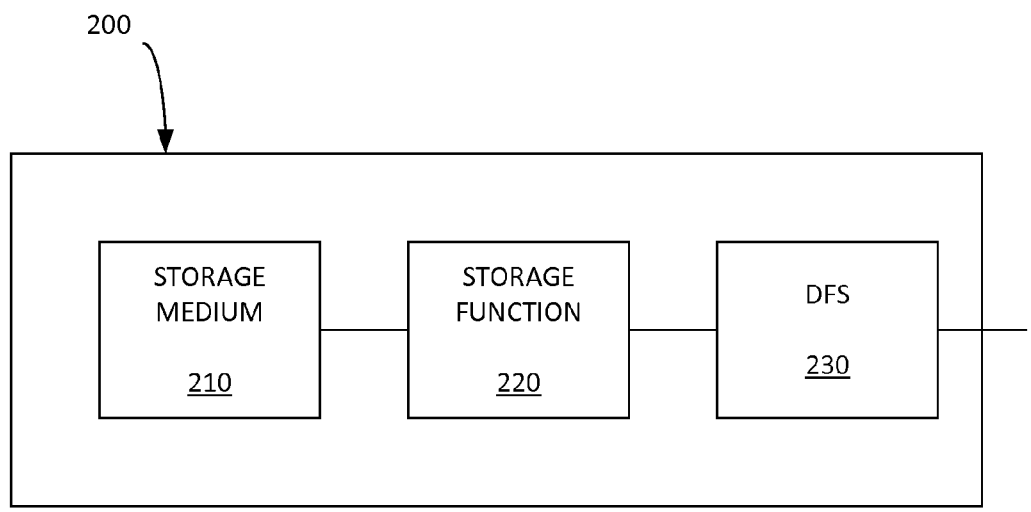
FIG. 2a shows an intelligent storage.

Referring to FIG. 2a, an intelligent storage 200 is shown to include storage medium 210, storage function block 220 and DFS block 230. Intelligent storage 200 preferably provides mass storage as opposed to a main memory function. Storage medium 210 can be a memory like solid-state, optical, magnetic, MEMS and holographic. Examples are nonvolatile memories like FLASH, PRAM, FRAM, ReRAM, STRAM, MRAM, CD, DVD, magneto-optical, tape, hard disc, floppy disc, etc. Another example is a combination of any two or more of the foregoing memories into a hybrid storage, like FLASH and a magnetic disc. Other memories that are volatile can be used, optionally configured to maintain the non-volatility of the memories' contents.

Storage function block 220 can include the firmware and hardware that perform the storage functions, such as controlling the writing and reading of data on storage medium 210. Storage function block 220 for a disc drive includes, for example, the spindle motor, VCM, actuator arm with transducer, controller, buffer memory, etc. and associated firmware. Storage function block 220 for a solid-state drive includes, for example, a controller, buffer memory and associated firmware.

DFS block 230 is at least the firmware and/or software that composes the DFS, and an OS/Kernel if used. The hardware that runs this firmware and/or software can be separate from the hardware of storage function block 220, can share hardware with storage function block 220 or can be the same hardware of storage function block 220. Thus, DFS block 230 can be on the same PCB, in the same IC package or the same SoC as storage block function 220, or can be contained in a housing of intelligent storage 200. For mass storage devices the preference is to maintain its form factor. The firmware and/or software of DFS block 230 can be partly or wholly combined with the firmware of storage function block 220.

At the least, storage function block 220 can scan storage medium 210 to detect errors, such as when a disc drive performs an internal reliability operation like a background media scan or read-verify-write to detect errors. The controller in storage function block 220 with any associated firmware can perform the internal reliability operation. The scan can be initiated by storage function block 220 firmware, DFS block 230 or a request external to intelligent storage 200. Errors can then be detected that have not yet been detected by DFS block 230 (if capable of such detection), or any device, software or firmware interacting with intelligent storage 200. Storage function block 220 can therefore attempt to fix those errors before they are detected by DFS block 230 or the device, software or firmware. If an uncorrectable read error is encountered, storage function block 220 can notify DFS block 230 or the device, software or firmware. For DFS block 230, notification can be done by an interrupt to the kernel space from either an inter-process communication like shared memory or Linux's sysfs virtual file system. Once notified, DFS block 230 or the device, software or firmware can request other distributed storage to transfer the replicated data associated with the uncorrectable read error. The decision to initiate the transfer of the replicated data can be made by either storage function block 220, DFS block 230 or the device, software or firmware.

When received, the logical sectors with the uncorrectable read error can be overwritten with the newly received data. Storage function block 220 will mark as defective the old physical location and place the new data at a different physical location. In this way the sector data was exchanged over DFS and used to recover the data that contained errors.

Figure 2B:
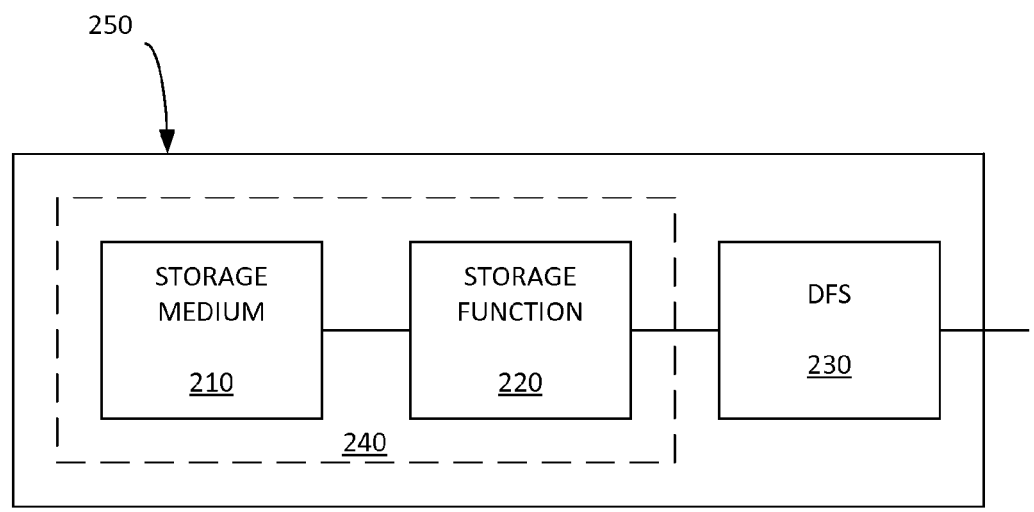
FIG. 2b shows a distributed storage.

As an alternative to the intelligent storage described, distributed storage can also be at least one mass storage device coupled to a host like a personal computer, server, workstation, RAID, JBOD, etc. The host would be running the DFS. To illustrate this distributed storage, reference is made to FIG. 2b. In this case storage medium 210 and storage function block 220 are included in the mass storage device 240. The DFS block 230 is not included in the mass storage device, but instead in a host 250. The host can have a motherboard or controller on which the DSF operates depending on the type of host. The connection between the host and the mass storage device can be an interface such as SCSI, SATA, USB, 1394, Thunderbolt, SAS, PCI, etc. The mass storage device can initiate a media scan either by itself or from a host request, and would notify the host of the data error. The interface command set can be modified to pass the notice, or an unused portion of a command can be used. The associated device driver in the host may also have to be modified along with the DSF. Then the DFS running on the host would go about obtaining a data copy and saving it in the mass storage device. Furthermore, a distributed storage can include multiple hosts and/or intelligent storage, preferably appearing to the rest of the DFS as a node or single device.

Figure 3:
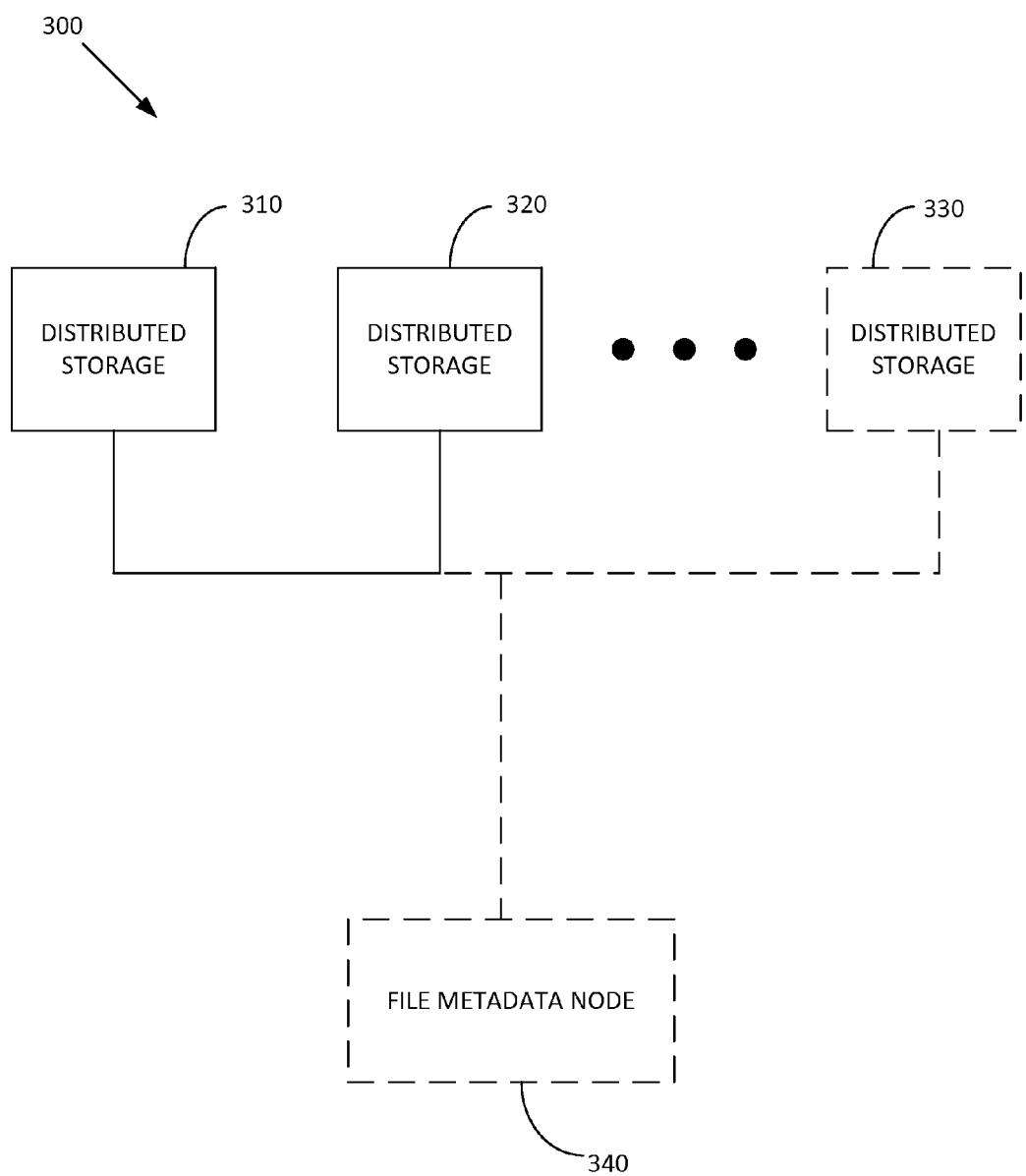
FIG. 3 shows another distributed file system.

More generally, FIG. 3 shows a distributed file system 300 that includes at least two distributed storage 310, 320, and can include up to N distributed storage 330. A distributed storage can be an intelligent storage like the disc drive described above. Or it can be the distributed storage described in FIG. 2b. And the distributed storage 310, 320, 330 of distributed file system 300 (FIG. 3) can be homogenous or heterogeneous.

Depending on the number of distributed storage and the file system used, maintaining file metadata like a list of distributed storage that have the replicated block may not be necessary. Alternatively, one or more of the distributed storage can maintain such metadata or a node like Hadoop's namenode can maintain the metadata information for the distributed storage. Such is shown in FIG. 3 as file metadata node 340.

Figure 4:
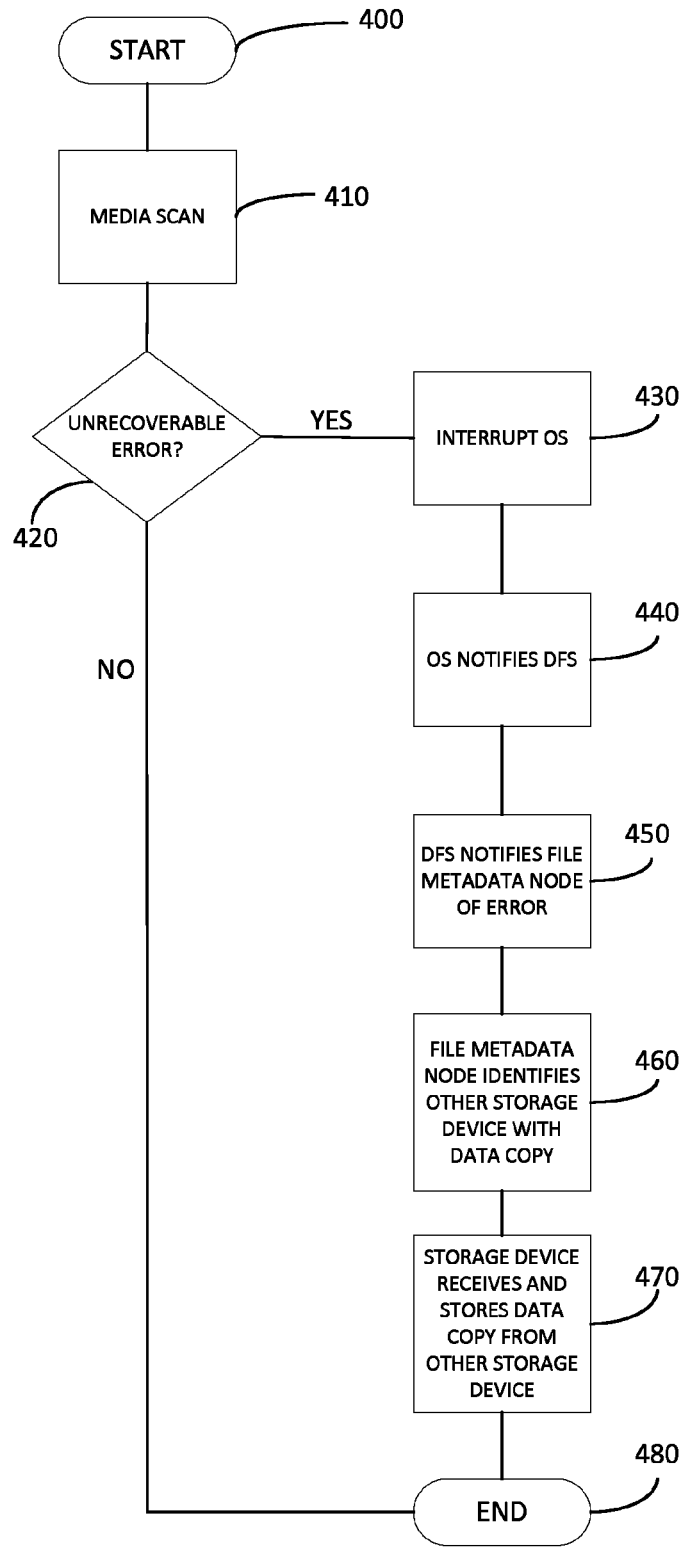
FIG. 4 shows a flowchart for data error recovery.

An example of a data recovery will be described with reference to FIG. 4. The process starts at step 400, then proceeds to step 410 where the distributed storage performs a media scan. If the distributed storage is intelligent storage, the media scan can be initiated by its firmware. If the distributed storage is a host with a mass storage device, the media scan can be initiated by the mass storage device itself or from a host request. Or the media scan can be initiated by a command external to the distributed storage. From there the process proceeds to step 420 to determine if an error is found. One criterion for finding an error is if the error is unrecoverable. Other criteria may be used for finding an error, such as a time-limited or number-limited retries.

If no error is found, the process proceeds to step 480 and ends. If yes, the process proceeds to step 430 where the operating system on the distributed storage is interrupted. Then at step 440 the operating system notifies the distributed file system on the distributed storage of the error. At step 450 the distributed file system notifies the file metadata node of the error. At step 460 the file metadata node responds to the distributed storage with the information identifying another distributed storage that contains a copy of the data. Or the file metadata node can communicate with the other distributed storage that contains a copy of the data to send the copy to the distributed storage with the data error. Regardless, at step 470 the distributed storage interacts with the other distributed storage to receive and store the data copy. The process ends at step 480.

Figure 5:
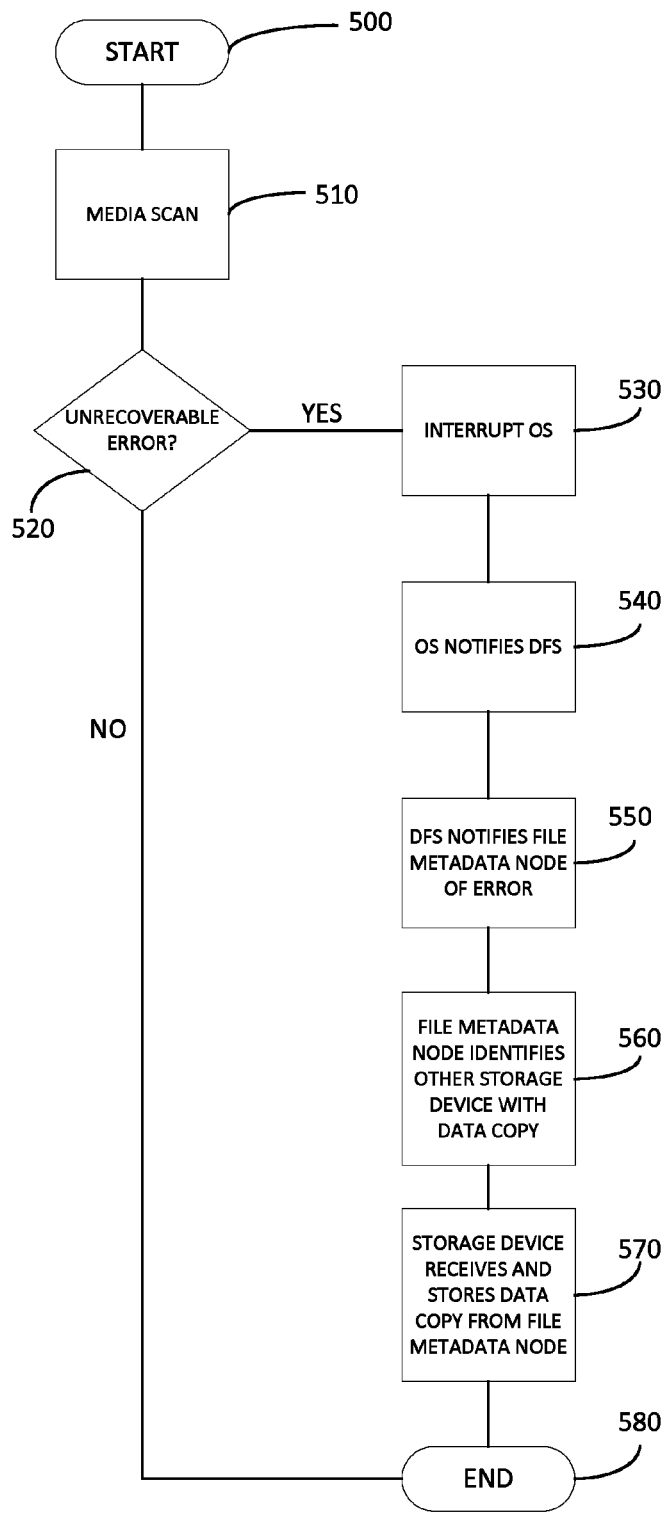
FIG. 5 shows another flowchart for data error recovery.

The process of receiving the data copy in the event of an error is not limited to the process described. Alternative processes exist, one shown in FIG. 5. The process starts at step 500 and proceeds to step 510 where the distributed storage performs a media scan. The process then proceeds to step 520 to determine if an error is found. If no, the process proceeds to step 580 and ends. If yes, the process proceeds to step 530 where the operating system running on the distributed storage is interrupted. At step 540 the operating system notifies the distributed file system on the distributed storage of the unrecoverable error. At step 550 the distributed file system notifies the file metadata node of the error. At step 560 the file metadata node retrieves a copy of the data from another distributed storage. At step 570 the distributed storage interacts with the file metadata node to receive and store the data copy. The process ends at step 580.

Figure 6:
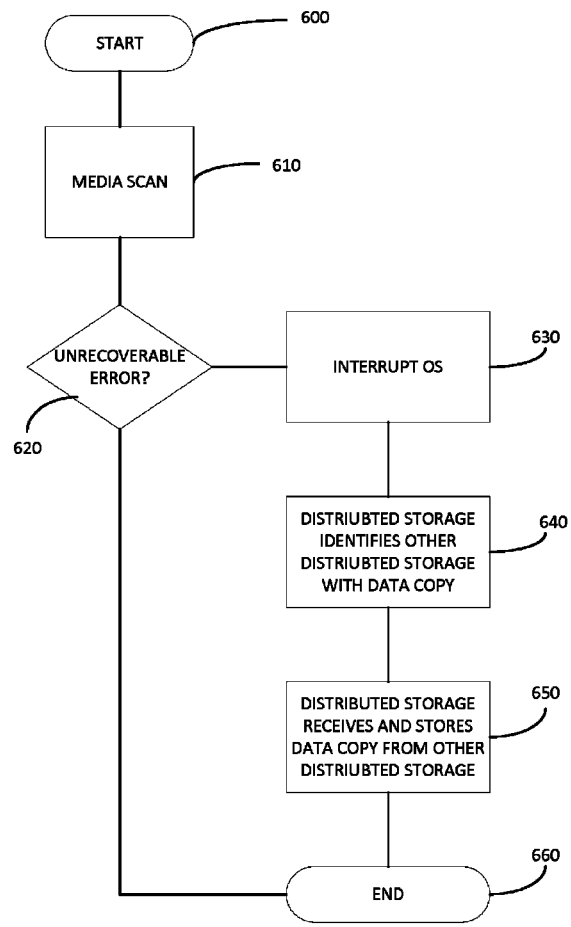
FIG. 6 shows a further flowchart for data error recovery.

Another process of receiving the data copy in the event of an error is shown in FIG. 6. The process starts at step 600, then proceeds to step 610 where the distributed storage performs a media scan. From there the process proceeds to step 620 to determine if an error is found. If no, the process proceeds to step 660 and ends. If yes, the process proceeds to step 630 where the operating system on the distributed storage is interrupted. Then at step 640 the operating system and/or the DFS residing in the distributed storage determines another distributed storage that contains a copy of the data. This can be accomplished by the distributed storage maintaining file metadata. At step 650 the distributed storage interacts with the other distributed storage to receive and store the data copy. The process ends at step 660.

Figure 7:
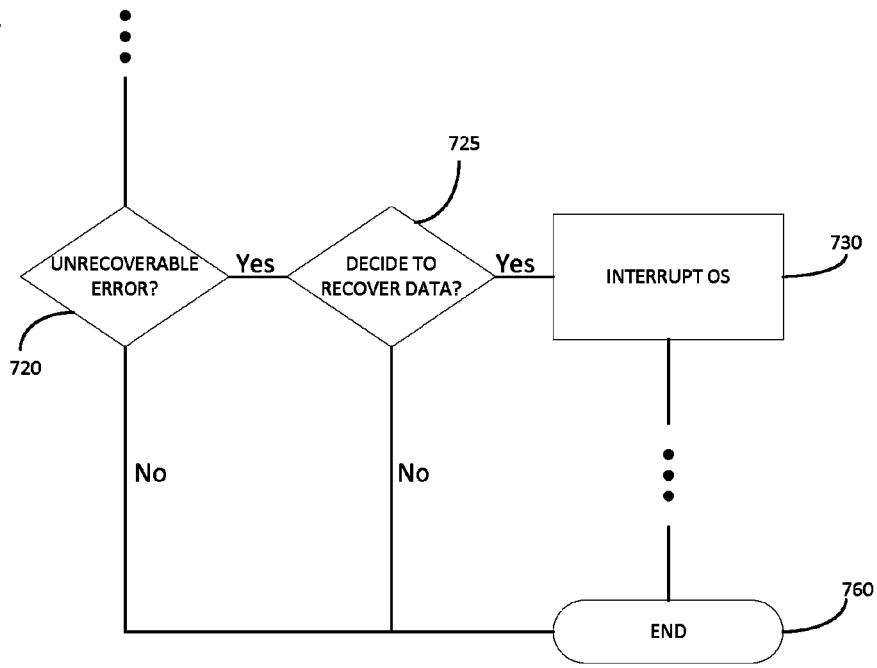
FIG. 7 shows a decision flowchart for data error recovery.

A decision flowchart is shown in FIG. 7. This decision flowchart can be applied to any of the processes described above. At step 720 the distributed storage determines if a recoverable error exists. If no, the process ends at step 760. If yes, the process proceeds to step 725 where the storage function (e.g., storage function block 220) of the distributed storage decides if a data recovery process should be initiated. If yes, then at step 730 the OS, file system (e.g., DFS), host firmware, etc. is interrupted. From there steps such as the ones described are performed for the data recovery. If the storage function of the distributed storage decides not to initiate a data recovery, the process ends at step 760.

Figure 8:
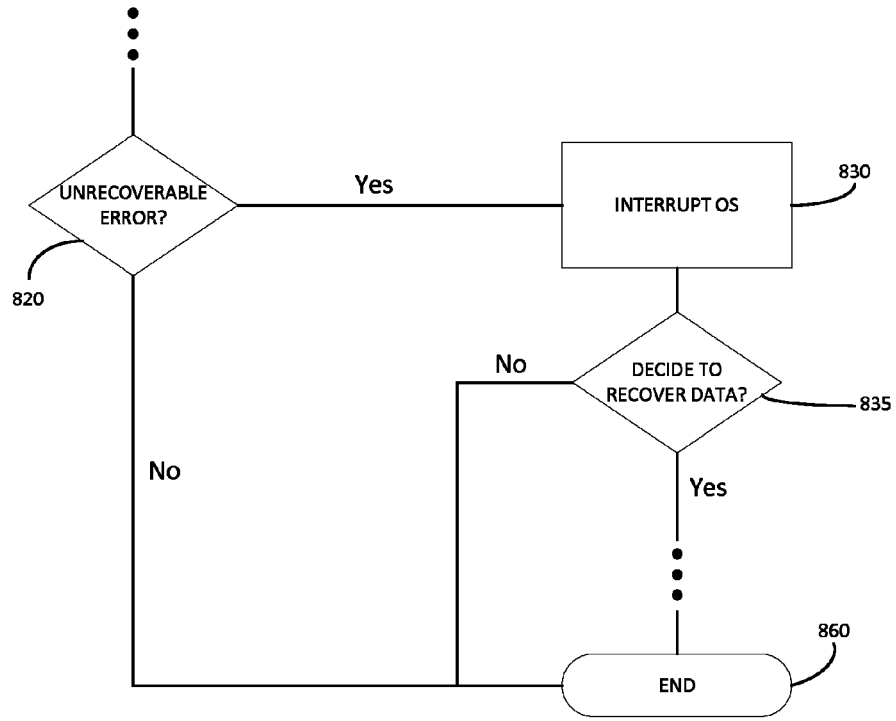
FIG. 8 shows another decision flowchart for data error recovery.

Another decision flowchart is shown in FIG. 8. This decision flowchart can be applied to the processes described above. At step 820 the distributed storage determines if a recoverable error exists. If no, the process ends at step 860. If yes, the process proceeds to step 830 where the OS is interrupted. Then the process proceeds to step 835 where the OS, file system (e.g., DFS), host firmware, etc. decides if a data recovery process should be initiated. If yes, then the steps such as the ones described are performed for the data recovery. If the OS, file system (e.g., DFS), host firmware, etc. decides not to initiate a data recovery, the process ends at step 860.

Modifications to existing DFS can be made to accommodate the processes described. As explained above, a datanode in HDFS performs error detection on HDFS files using a CHECKSUM function. If a data error is found, the datanode notifies the namenode, which removes that datanode from the DFS and re-replicates the data to another datanode. One modification would be to delete the datanode removal function when it reports an error. Instead, the namenode would pass to the datanode either a copy of the data or the identity of another datanode that has the data copy. In this way, the DFS does not remove a storage device for a data error that can be easily recovered.

Although the description above describes the data recovery generally, some examples use Hadoop's HDFS to which the data recovery is not limited. Other DFSs can be used, such as Microsoft's Window Server DFSR, XtreemFS and the Google File System (GFS), that provide for replicated data. And non-distributed file systems can be used that provide for replicated data. Furthermore, the DFS is described using a network configuration, such as a LAN. The actual interconnection scheme, such as ring, hub and spoke, mesh, etc. does not limit the data recovery. Also, Internet, WAN, SAN, different physical locations, etc. does not limit the data recovery. Nor is the data recovery limited by the connections used, such as Ethernet, fiber, wireless, etc.

The described apparatus and methods should not be limited to the particular examples described above. Various modifications, equivalent processes, as well as numerous structures to which the described apparatus and methods may be applicable will be readily apparent.

What is claimed is:

1. A device comprising:
   a storage medium; and
   a storage function block configured to:
      scan the storage medium to detect an error;
      when an error is detected, attempt to correct the error;
      when the error is uncorrectable, generate a data retrieval command operable to initiate a retrieval of a replicated copy of data associated with the error from a file system;
      when the replicated copy of data is received, overwriting logical sectors of the data storage medium corresponding to the error with the replicated copy of data, the overwritten logical sectors corresponding to a different physical location on the storage medium than a physical location that previously stored the data.

2. The device of claim 1 wherein the storage function block is configured to detect the error and to independently decide to start a retrieval of the replicated copy of data responsive to the error being uncorrectable.

3. The device of claim 1 further comprising a distributed file system (DFS) block that includes the file system.

4. The device of claim 1 wherein the device is a disc drive configured to operate the file system.

5. The device of claim 3 wherein the DFS is configured to maintain file metadata and the file system, and to obtain the replicated data based on the file metadata.

6. The device of claim 1 wherein the storage function block is configured to initiate and detect the error prior to the file system detecting the data error.

7. The device of claim 4 wherein the disc drive is configured to operate the file system and interact with file metadata to obtain the replicated data.

8. The device of claim 7 wherein the disc drive is further configured to maintain the file metadata.

9. A distributed storage comprising:
   a storage device;
   a file system block; and
   a storage function block configured to:
      determine a data error at a first physical location of the storage device, the data error determined independent of the file system block;
      responsive to the data error, initiate a retrieval of a data copy by notifying the file system block;
      receive the data copy from another distributed storage; and
      store the data copy at a second physical location of the storage device.

10. The distributed storage of claim 9 wherein the storage function block is configured to perform a media scan on the storage device to determine the data error.

11. The distributed storage of claim 9 wherein the storage function block is configured to detect the data error prior to the file system block detecting the data error.

12. The distributed storage of claim 9 wherein the distributed storage is an intelligent storage device.

13. The distributed storage of claim 12 wherein the intelligent storage device is a disc drive.

14. A distributed file system comprising a plurality of distributed storage, wherein at least one of the plurality of distributed storage includes a storage function block configured to detect a data error on a specific storage medium and to initiate a retrieval of a data copy from another one of the plurality of distributed storage responsive to the data error, and the storage function block configured to store the data copy to the specific storage medium.

15. The system of claim 14 further comprising a file metadata node, wherein the distributed file system interacts with the file metadata node to determine the other one of the plurality of distributed storage.

16. The system of claim 14 wherein the at least one of the plurality of distributed storage maintains file metadata, wherein the distributed file system uses the file metadata to determine the other one of the plurality of distributed storage.

17. An intelligent storage comprising:
    a storage medium;
    a controller configured to determine a data error on the storage medium prior to a file system block detecting the data error; and
    the file system block configured to retrieve a data copy from a different storage device and store the data copy to the storage medium when the data error is determined.

18. The intelligent storage of claim 17 wherein the controller is configured to maintain file metadata that is used by the file system to obtain the data copy.

19. The intelligent storage of claim 17 wherein the data error is unrecoverable.

20. The intelligent storage of claim 17 wherein the controller is configured to initiate retrieval of the data copy.

21. The device of claim 1 further comprising an interface to connect the device to a network, the storage function block configured to receive the replicated copy of data, via the interface, from another device coupled to the network.

22. The distributed storage of claim 9 wherein the storage function block is configured to mark the first physical location as defective.

23. The distributed file system of claim 14 wherein the storage function block is configured to, when the data copy is received, overwrite logical sectors of the specific storage medium corresponding to the data error with the data copy, the overwritten logical sectors corresponding to a different physical location on the storage medium than a physical location that was previously associated with the logical sectors.

24. The intelligent storage of claim 17 further comprising:
   a communication link configured to communicate with a distributed file system; and
   the file system blocks includes a memory storing an operating system configured to allow the intelligent storage to communicate with the distributed file system without the intelligent storage being part of a host.

25. The intelligent storage of claim 24 wherein the file system block and the controller are contained in a same system on a chip (SoC).

\* \* \* \* \*